(12) United States Patent
Manberg et al.

(10) Patent No.: US 10,311,737 B2
(45) Date of Patent: Jun. 4, 2019

(54) SYSTEMS AND METHODS FOR SELECTING AND DESIGNATING ADS-B TRAFFIC (71) Applicants: Charles Manberg, Peoria, AZ (US); Richard Ridenour, II, Peoria, AZ (US)

(72) Inventors: Charles Manberg, Peoria, AZ (US); Richard Ridenour, II, Peoria, AZ (US)

(73) Assignee: AVIATION COMMUNICATION & SURVEILLANCE SYSTEMS LLC, Phoenix, AZ (US)

( * ) Notice: Subject to any disclaimer, the term of this patent is extended or adjusted under 35 U.S.C. 154(b) by 262 days.

(21) Appl. No.: 15/295,760

(22) Filed: Oct. 17, 2016

(65) Prior Publication Data
US 2018/0233051 A1  Aug. 16, 2018

Related U.S. Application Data (60) Provisional application No. 62/242,753, filed on Oct. 16, 2015.

(51) Int. Cl.
G08G 5/00 (2006.01)
G06F 3/0484 (2013.01)
G06F 3/0481 (2013.01)

(52) U.S. Cl.
CPC ....... *G08G 5/0021* (2013.01); *G06F 3/04817* (2013.01); *G06F 3/04842* (2013.01); *G08G 5/0008* (2013.01); *G08G 5/0013* (2013.01); *G08G 5/0078* (2013.01)

(58) Field of Classification Search
None
See application file for complete search history.

(56) References Cited

U.S. PATENT DOCUMENTS

| 7,403,132 | B2 * | 7/2008 | Khatwa | G01C 23/00 |
| | | | | 340/970 |
| 2011/0006918 | A1 * | 1/2011 | Shafaat | G08G 5/0008 |
| | | | | 340/945 |
| 2012/0182161 | A1 * | 7/2012 | Rutherford | G08G 5/0008 |
| | | | | 340/945 |
| 2017/0103660 | A1 * | 4/2017 | Shafaat | G08G 5/0008 |

* cited by examiner

*Primary Examiner* — Thomas G Black
*Assistant Examiner* — Demetra R Smith-Stewart
(74) *Attorney, Agent, or Firm* — Dickinson Wright PLLC (57) ABSTRACT

Various navigation and other instrumentation systems may benefit from appropriate methods for selection of traffic. For example, certain avionics may benefit from systems and methods for selecting and designating ADS-B or similar traffic. An apparatus can include a display and a processor. The processor and the display can be configured to permit selection of at least one target aircraft identified on the display.

21 Claims, 10 Drawing Sheets

SYSTEMS AND METHODS FOR SELECTING AND DESIGNATING ADS-B TRAFFIC

CROSS-REFERENCE TO RELATED APPLICATION

This application is related to and claims the benefit and priority of U.S. Provisional Patent Application No. 62/242,753 filed on Oct. 16, 2015, the entirety of which is hereby incorporated herein by reference.

BACKGROUND

Field

Various navigation and other instrumentation systems may benefit from appropriate methods for selection of traffic. For example, certain avionics may benefit from systems and methods for selecting and designating ADS-B or similar traffic.

Description of the Related Art

The useful life of a modern aircraft may be 20 years or more. During the lifetime of a given aircraft, many technological advances may be made that may result in new functionality that may be desirable to have on the aircraft. For instance, new technology may provide better navigation accuracy, improved pilot awareness, increased passenger comfort or any other enhancement. Operators of aircraft are often desirous of adding new technology to existing aircraft.

One area of on-going technological advancement is in regard to the Automatic Dependent Surveillance-Broadcast (ADS-B). Two services of ADS-B are ADS-B Out and ADS-B In. ADS-B Out includes the function whereby an aircraft broadcasts information, such as its GPS position and altitude, over a radio frequency link, so that the data can be received by Air Traffic Control (ATC), as well as other aircraft. ADS-B In includes the function whereby an aircraft may be configured to receive the ADS B Out broadcasts from other aircraft and present select information regarding the other aircraft to the pilot. Such traffic data may be shown to a pilot on a display, such as a display known as the Cockpit Display of Traffic Information (CDTI) display. In addition to actually displaying information to the pilot, a CDTI display may provide the capability to allow the pilot to select or designate an individual aircraft from a group of displayed aircraft. The CDTI display may then display the selected aircraft with special symbology to allow the pilot to more easily monitor a particular (selected) aircraft.

The many advantages of ADS-B In are well documented and may include improved pilot awareness, which may result in increased safety, and improved operational efficiency, which may result in lower operating costs, reduced fuel burn, reduced carbon dioxide emissions and reduced noise pollution.

However, modifying an aircraft to include a CDTI display can be quite costly, particularly on an aircraft with electronic flight displays. Cockpit display manufacturers often design the display systems, so that new information cannot be presented on the displays without the display hardware and/or software being updated. Display manufacturers often charge high prices for such modifications.

Many current generation aircraft have electronic flight displays that can display a limited set of traffic icons that may be based on Traffic Alert and Collision Avoidance System II (TCAS II) functionality, as described and referenced in: (1) RTCA document DO-185B "Minimum Operational Performance Standards for Traffic Alert and Collision Avoidance System II (TCAS II)" (hereby incorporated by reference in its entirety), (2) FAA document TSO C119c "Traffic Alert and Collision Avoidance System (TCAS) Airborne Equipment, TCAS II with Optional Hybrid Surveillance" (hereby incorporated by reference in its entirety) and (3) FAA document AC20-151B "Airworthiness Approval of Traffic Alert and Collision Avoidance Systems (TCAS II), Versions 7.0 & 7.1 and Associated Mode S Transponders" (hereby incorporated by reference in its entirety).

Figure 1:
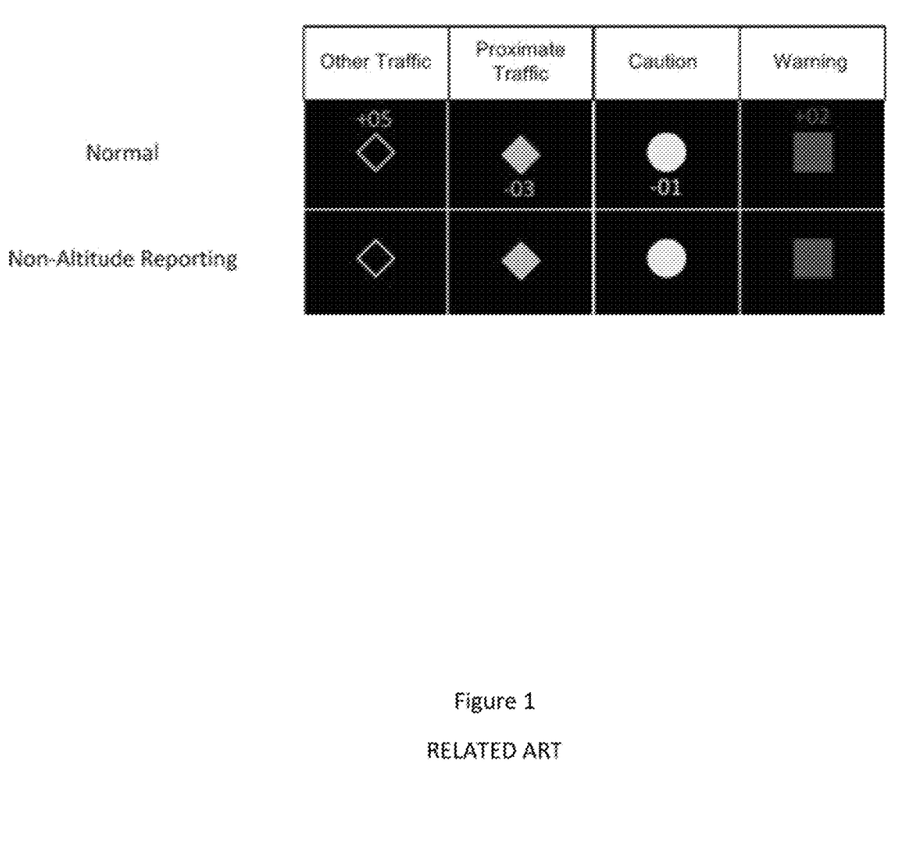
FIG. 1 illustrates a typical TCAS II traffic symbol set.

FIG. 1 illustrates a typical TCAS II traffic symbol set. As shown in FIG. 1, there can be normal and non-altitude reporting symbols. The normal symbols include an indication of relative altitude (altitude of target relative to own ship). The symbols can include a hollow diamond for other traffic, a solid diamond for proximate traffic, a circle for caution, and a square for warning. The diamonds may be cyan, the circles may be yellow, and the squares may be red.

Additionally, TCAS systems often have a selection to allow a pilot to choose if non-threatening traffic (i.e., Proximate and Other Traffic) are always displayed or displayed only when a traffic alert occurs.

Figure 2:
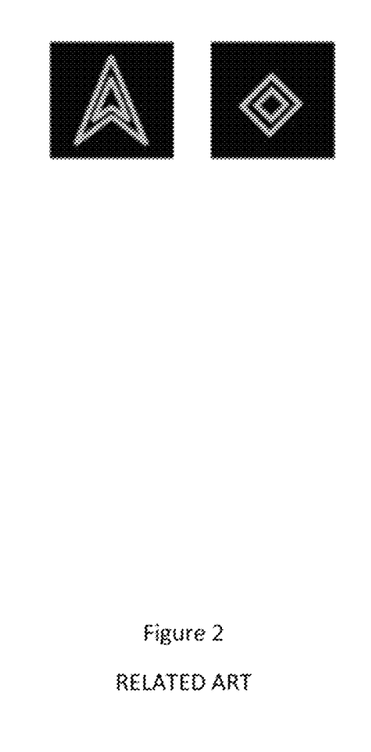
FIG. 2 illustrates DO-317B designated traffic symbols.

FIG. 2 illustrates DO-317B designated traffic symbols. In contrast to a TCAS display, a full-up ADS-B In system typically requires many more symbols, such as the examples shown in FIG. 2 for Designated Traffic, taken from RTCA document DO-317B "Minimum Operational Performance Standards (MOPS) for Aircraft Surveillance Applications (ASA) System."

Figure 3A:
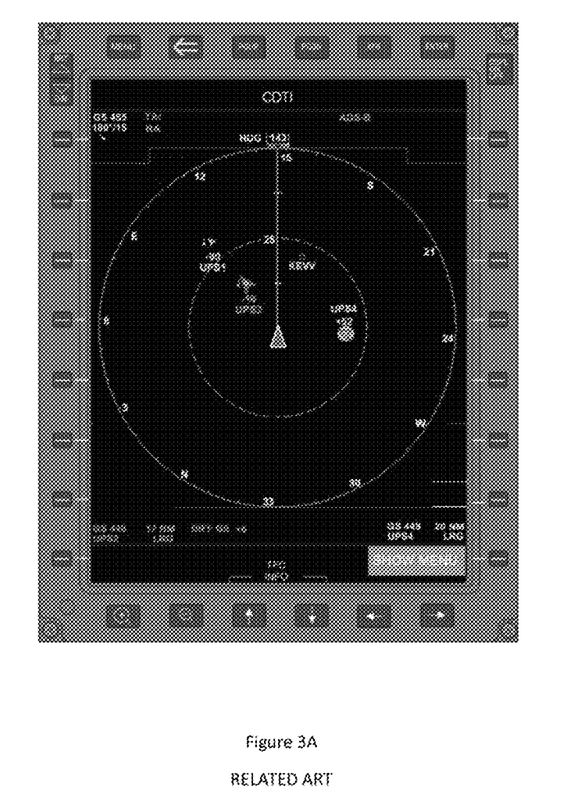
FIG. 3A illustrates a sample CDTI display.

FIG. 3A illustrates a sample CDTI display. As can be seen in the representative example of FIG. 3A, a CDTI display may often include bezel buttons or employ a cursor control device to allow a pilot to select an individual aircraft from the display. These buttons may be arranged around the display, and may include zoom buttons as well as left, right, up, and down scrolling buttons. The center of the display may include an own ship identifier with heading, and icons for target aircraft in the vicinity of own ship.

Figure 3B:
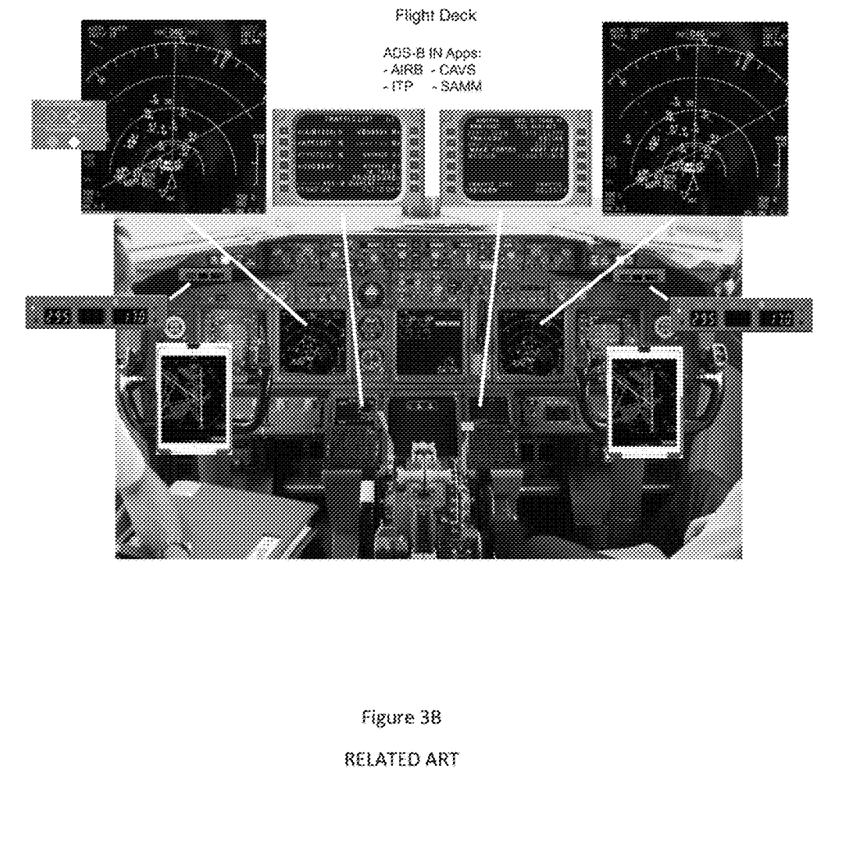
FIG. 3B illustrates a sample flight deck.

FIG. 3B illustrates a flight deck. As can be seen in FIG. 3B, a flight deck may contain numerous displays involving a variety of ADS-B In applications, such as ADS-B enhanced Traffic Situational Awareness-Airborne Surveillance (ATSA-AIRB), CDTI assisted visual separation (CAVS), in-trail procedures (ITP), and surface area movement management (SAMM).

Adding a new display and pilot input device to the flight deck to provide CDTI functionality may not be practical or even possible due to the size limitations of aircraft cockpits, as can be seen from FIG. 3B. Also, updating existing display systems is usually costly.

SUMMARY

According to certain embodiments, an apparatus can include a display and a processor. The processor and the display can be configured to permit selection of at least one target aircraft identified on the display.

In certain embodiments, an apparatus can include a display and a processor. The processor and the display can be configured to permit display of multiple nearly co-located targets on the display in a distinguishable manner.

A method, according to certain embodiments, can include displaying an identification of at least one target aircraft on a display. The method can also include permitting selection of the at least one target aircraft identified on the display.

BRIEF DESCRIPTION OF THE DRAWINGS

For proper understanding of the invention, reference should be made to the accompanying drawings, wherein.

DETAILED DESCRIPTION

Certain embodiments of the present invention may advantageously be able to provide at least partial ADS-B In functionality, while minimizing any requirements for updating one or more cockpit displays. For example, certain embodiments of the present invention may provide systems and methods to allow a pilot to select and designate an aircraft for purposes of performing ADS-B In applications.

Moreover, certain embodiments of the present invention may overcome the above-identified and other limitations by using existing display and pilot input devices in new ways and by updating an aircraft's TCAS computer to provide a modified traffic buffer to the existing traffic display.

Figure 4A:
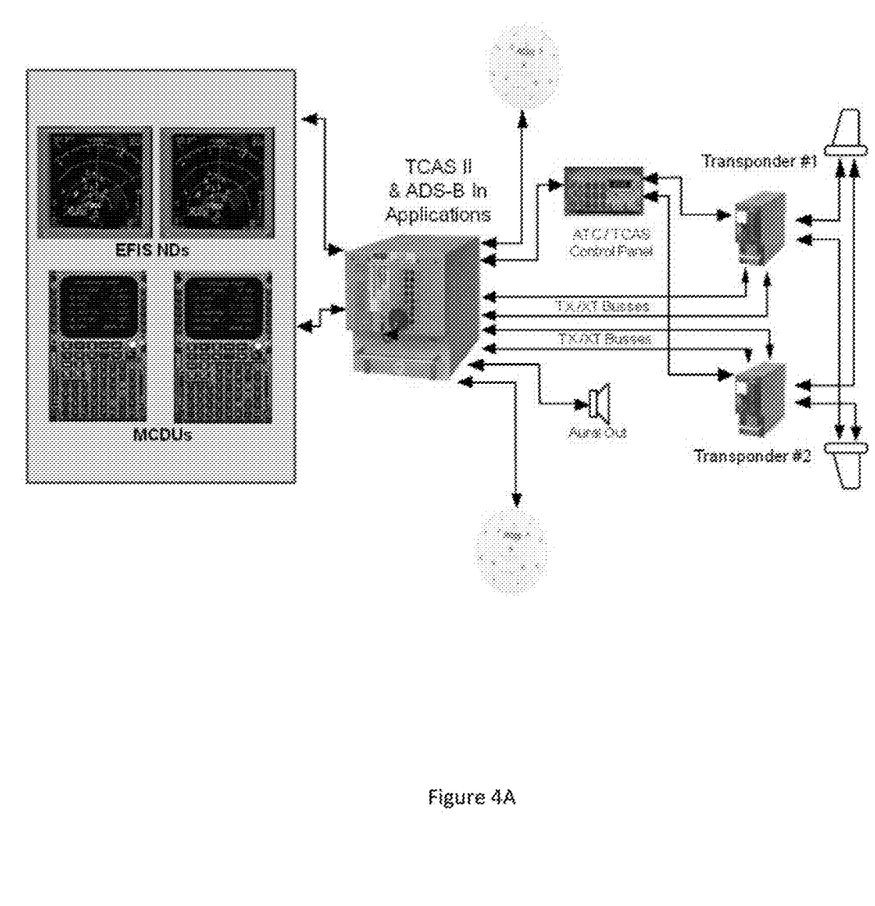
FIG. 4A illustrates a sample system architecture, according to certain embodiments of the present invention.

FIG. 4A illustrates a sample system architecture, according to certain embodiments of the present invention. Certain embodiments of the present invention, shown by way of example in FIG. 4A, may employ a TCAS computer unit that may interface with one or more Multi-purpose Control and Display Units (MCDU) and process inputs from them. The TCAS computer unit may additionally transmit appropriate traffic data to one or more Navigation Displays (ND), which may be part of the Electronic Flight Instrument System (EFIS).

The TCAS computer system may be provided with TCAS II and ADS-B In applications. The TCAS computer system can be provided with a top TCAS antenna, and a bottom TCAS antenna, each of which can be a directional antenna. The computer system may include an ATC/TCAS control panel. The ATC/TCAS control panel can be connected to transponder #1 and transponder #2. Each of the transponders may be connected to both a top antenna and a bottom antenna. The transponders can also be connected by TX/XT busses to the TCAS computer system. The TCAS computer system may be connected to a speaker or other aural output.

Figure 4B:
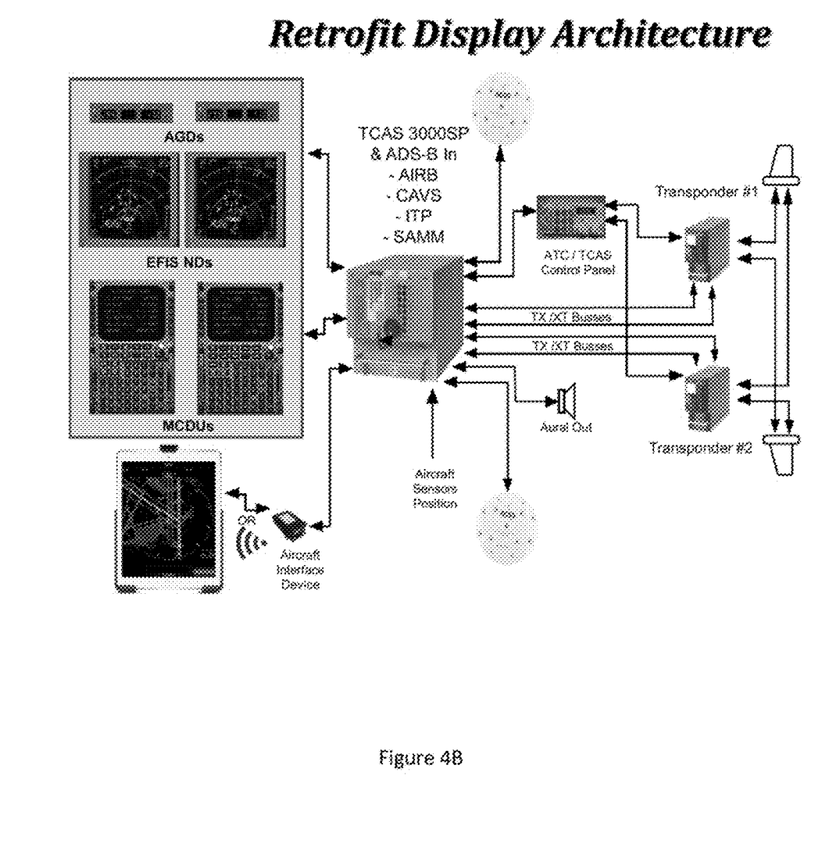
FIG. 4B illustrates a further sample system architecture, according to certain embodiments of the present invention.

FIG. 4B illustrates a further sample system architecture, according to certain embodiments of the present invention. The architecture of FIG. 4B can further include ADS-B guidance displays (AGDs) interfaced to the TCAS computer system. The TCAS computer can include input from aircraft sensors that provide aircraft sensors position. The TCAS computer can also be provided with an aircraft interface device that permits connection of a tablet, smart phone, or other device to the TCAS computer using, for example, a wireless connection.

Additional embodiments of the present invention, also shown by way of example in FIGS. 4A and 4B above, may employ a TCAS computer that may interface to one or more MCDUs using a protocol essentially the same as the protocol defined in ARINC Characteristic A739A-1 "Multi-Purpose Control and Display Unit". The MCDUs may display traffic information, such as flight identification (Flight ID) or range/bearing, and may allow the pilot to select a particular traffic element based on the information presented.

Figure 5:
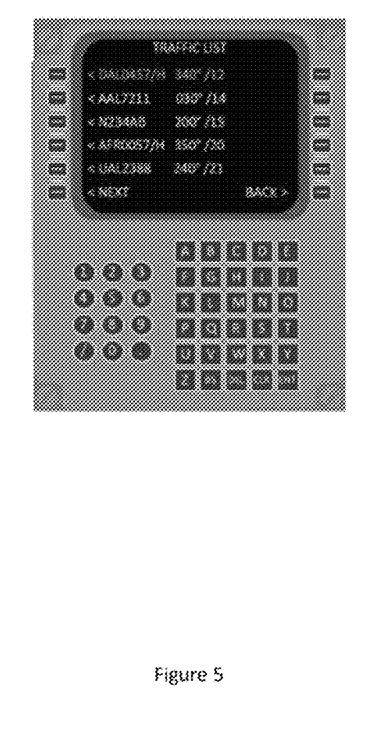
FIG. 5 illustrates a sample MCDU, according to certain embodiments of the present invention.

FIG. 5 illustrates a sample MCDU, according to certain embodiments of the present invention. As shown in FIG. 5, the MCDU may include a display of information, such as a traffic list. There may be buttons at outer edge(s) of the display. These buttons can be configured to permit selection of a corresponding aircraft from the traffic list. The MCDU may also include a number pad and/or an alphabet pad, or an alpha-numeric keyboard. The buttons can also include scrolling buttons permitted to scroll additional information on the display.

In additional embodiments of the present invention, the transmission of traffic data to a display may be limited to only those aircraft that are relevant to a given operation or which are triggering an alert. For instance, if a pilot has designated a particular aircraft as the traffic-to-follow for a CDTI Assisted Visual Separation (CAVS) approach, the TCAS computer may be programmed to only transmit data for a particular aircraft to the display. This may enable the pilot to uniquely identify the aircraft of interest on the display. In such embodiments, it is expected that in the event that a TCAS alert occurred, the TCAS computer could transmit data to the display for not only the Traffic To Follow but for any other aircraft that potentially posed a safety threat.

Figure 6:
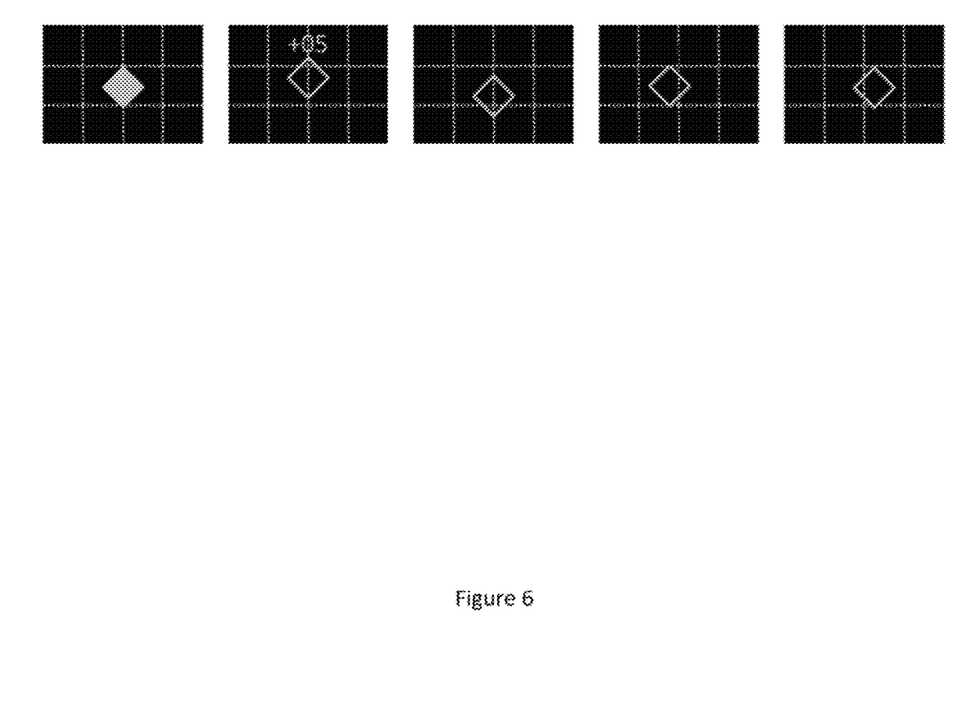
FIG. 6 illustrates multiple nearly co-located TCAS symbols, according to certain embodiments of the present invention.

FIG. 6 illustrates multiple nearly co-located TCAS symbols, according to certain embodiments of the present invention. In certain embodiments of the present invention, multiple traffic icons may be used from the basic TCAS symbol set or other known symbol sets to effectively create a new symbol. For instance, the TCAS computer could send out a set of four (or a set of any other number) "Other Traffic" and one "Proximate Traffic" traffic elements to the display, such as illustrated in FIG. 6. All five of these symbols could be associated with a particular aircraft.

Figure 7:
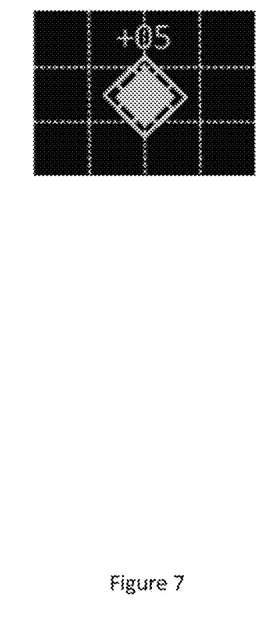
FIG. 7 illustrates a composite symbol according to certain embodiments of the present invention.

FIG. 7 illustrates a composite symbol according to certain embodiments of the present invention. As shown in FIG. 7, the TCAS computer can encode the nearly co-located traffic elements such that they were nearly collocated but offset from each other such that when they were all rendered by a display, they could form what appears to be a single composite symbol, as shown by way of example in FIG. 7. The resulting symbol may be similar to the DO-317B symbol for non-directional designated traffic. The resulting symbol may be the result of superimposition of the various offset versions of the same symbol.

In additional embodiments of the present invention, systems and methods consistent therewith could indicate a particular traffic element by alternatively drawing the designated traffic as proximate traffic and other traffic. This may have the effect of toggling the symbol between a filled diamond (i.e., Proximate Traffic symbol) and a hollow diamond (i.e., Other Traffic symbol), which may allow the pilot to uniquely identify the designated traffic.

In additional embodiments of the present invention, a TCAS computer unit could use the extended test text display protocol, as defined in ARINC Characteristic 735B "Traffic Computer TCAS and ADS-B Functionality." Note that the ability to use this protocol for other than on-ground maintenance purposes may be dependent on the capability of the display and the design assurance level of the applicable software.

Certain embodiments of the present invention can be an apparatus that includes a display and a processor. The display can be any visual display, such as the display of a MCDU, as described above. The processor can be any computer processor or set of processors. For example, the processor can include one or more central processing unit (CPU), application specific integrated circuit (ASIC), field programmable gate array (FPGA), or other controller or microcontroller hardware. The processor can also be equipped with memory on the same chip, or memory in a separate module. The processor can be equipped with more than one memory, which can include read only memory (ROM), random access memory (RAM), or any other form of memory, including a non-transitory computer-readable medium configured to be encoded with instructions to perform a process, when the instructions are executed in hardware, such as in the processor(s). Any form of software or other computer program instructions or computer program code can be installed on the memory(ies) and/or processor(s).

The processor and display can be configured to permit selection of at least one target aircraft identified on the display. For example, there can be a plurality of buttons arranged around a periphery of the display. The plurality of buttons can be configured to operate with the processor to permit the selection of the at least one target aircraft. Alternatively, or in addition, the display can include a touch sensitive screen. The touch sensitive screen can be configured to operate with the processor to permit the selection of the at least one target aircraft. In further alternatives, selection can be done using gestures detected by a camera or other equipment or motion of an external peripheral, such as a remote control. As an additional item or further alternative, the apparatus can include an alpha-numeric keyboard provided with the display. The alpha-numeric keyboard can be configured to operate with the processor to permit the selection of the at least one target aircraft. For example, a user can enter the tail number of an aircraft in order to select the aircraft. Other options are also permitted.

The processor and the display can be configured to indicate the selection on the display through a combination of symbols for each target aircraft selected. The processor and the display can also be configured to temporarily remove from the display all the other targets than the selected aircraft.

The selection can be indicated for a predetermined time or indefinitely. For example, the selection can be indicated until a predetermined further trigger occurs. The selection can be indicated until, for example, a traffic alert occurs or a timer expires.

The processor and the display can be configured to indicate the selection by displaying, for each selected aircraft, a set of relatively offset multiple nearly co-located icons, such that the set of multiple nearly co-located icons appear as a combined symbol. Alternatively, or in addition, the processor and the display can be configured to indicate the selection by, for each selected aircraft, repeatedly changing a symbol associated with the selected aircraft.

The processor and the display can be configured to present a list of target aircraft. The selection of the at least one target aircraft can be from the list of target aircraft. The processor can be configured to present the list as a list of aircraft of interest based on at least one criterion. The criterion can be or include at least one of an aircraft being of relevance to a given operation or the aircraft having triggered an alert. In certain cases, the aircraft may be relevant to multiple operations, may have triggered multiple alerts, or both may be relevant to one or more operations and may also have triggered one or more alerts. The alert can be a traffic or collision avoidance alert, for example.

The selection permitted by the processor and display can be, for example, selection of traffic to follow. The processor can be further configured to highlight, on at least one interface, a target aircraft as being traffic to follow based on the selection.

In other, possibly complimentary or combined, embodiments of the present invention, an apparatus may include a display and a processor, as described above. The processor and the display can be configured to permit selection of at least one target aircraft identified on the display. The processor and the display can also be configured to temporarily remove from the display all the other targets than the selected aircraft The temporary removal can be for a predetermined time, such as for a few seconds or one minute. The processor and the display can be further configured to alter an appearance of the selected aircraft. For example, the altered appearance comprises displaying a combination of symbols for each target aircraft selected.

For example, the processor and the display can be configured to highlight a target on the display by repeatedly changing a symbol associated with the target. This may give the target the appearance of blinking, such as when the symbol changes between a filled symbol and a hollow symbol. The change can be periodic or aperiodic. This blinking (or other indication of selection) may be discontinued when a new aircraft is selected, when a triggering event occurs (such as a traffic advisory), when a timer expires, or when a user turns off the indication.

Highlighting can also be performed by decluttering the display of all other targets. This decluttering can be done for a limited time, such as a number of seconds or a minute. Optionally, rather than completely removing the other targets, the brightness or color of the other targets can be muted or lowered. For example, if the other targets are normally displayed at 100% brightness, they could instead be displayed at 50% brightness, while the selected target of interest is maintained at 100% brightness.

Figure 8:
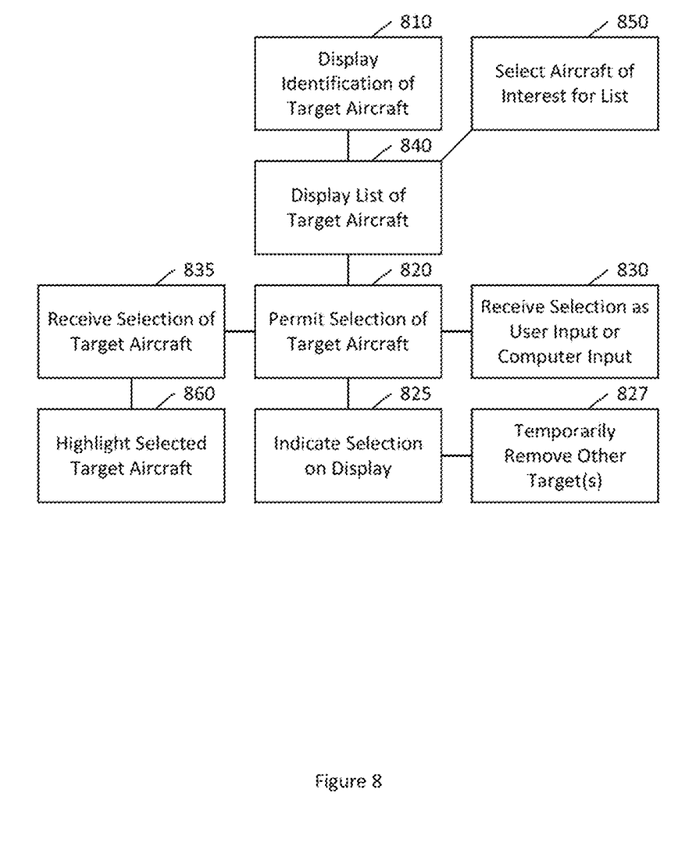
FIG. 8 illustrates a method according to certain embodiments of the present invention.

FIG. 8 illustrates a method according to certain embodiments of the present invention. As shown in FIG. 8, a method can include, at 810, displaying an identification of at least one target aircraft on a display. The method can also include, at 820, permitting selection of the at least one target aircraft identified on the display. Permitting the selection can include, at 830, receiving an input from a user interface or a computer interface. For example, the input can come by user pressing a button or touch sensitive screen. Alternatively, the input can come from another computer, such as a TCAS computer.

The method can further include, at 825, indicating the selection on the display through a combination of symbols for each target aircraft selected. The method can additionally include, at 827, temporarily removing from the display all the other targets than the selected aircraft. The selection can be indicated for a predetermined time, whether through a combination of symbols or through temporary removal of the other targets. Alternatively, or in addition, the selection can be indicated until a predetermined further trigger occurs.

The processor can be configured to indicate the selection by displaying, for each selected aircraft, a set of relatively offset multiple nearly co-located icons, such that the set of multiple nearly co-located icons appear as a combined symbol. The terms icons and symbols can be used interchangeably, with FIGS. 1 and 2 providing multiple possible icons or symbols. The processor can be configured to indicate the selection by, for each selected aircraft, repeatedly changing a symbol associated with the selected aircraft. For example, a hollow symbol (such as an "Other Traffic" symbol of FIG. 1) and a solid symbol (such as a "Proximate Traffic" symbol of FIG. 1) can be alternately displayed at regular or irregular intervals.

The method can also include, at 840, displaying a list of target aircraft. The selection permitted at 820 can be selection from the displayed list. The method can also include, at 850, selecting aircraft of interest for the list. The selecting the aircraft of interest can be based on at least one criterion, such as relevance of the aircraft to a given operation or the aircraft having triggered an alert. The given operation may be, for example, a taxiing or landing operation.

The method can further include, at 835, receiving the selection of the at least one target aircraft. The method can also include, at 860, highlighting, on at least one interface, the selected at least one target aircraft. This can be a highlighting in addition to the use of blinking or a combined static symbol.

Certain embodiments may have an advantage of being applicable to displays that are only able to display traditional symbols, such as those illustrated in FIG. 1. Thus, even such a legacy display can be configured to performing blinking or other indicia of selection, without needing to be upgraded to learn new symbols.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. An apparatus, comprising:
a display; and
a processor,
wherein the processor and the display are configured to
permit selection of at least one target aircraft identified on the display;
and
indicate the selection on the display through a combination of symbols for each target aircraft selected, wherein the processor and the display are configured to indicate the selection by displaying, for each selected aircraft, a set of relatively offset multiple nearly co-located icons, such that the set of multiple nearly co-located icons appear as a combined symbol.

2. The apparatus of claim 1, wherein the selection is indicated for a predetermined time.

3. The apparatus of claim 1, wherein the selection is indicated until a predetermined further trigger occurs.

4. An apparatus, comprising:
a display; and
a processor,
wherein the processor and the display are configured to
permit selection of at least one target aircraft identified on the display;
and
indicate the selection on the display through a combination of symbols for each target aircraft selected, wherein the processor and the display are configured to indicate the selection by, for each selected aircraft, repeatedly changing a symbol associated with the selected aircraft.

5. The apparatus of claim 4, wherein the selection is indicated for a predetermined time or until a predetermined further trigger occurs.

6. The apparatus of claim 4, wherein the selection comprises selection of traffic to follow.

7. An apparatus, comprising:
a display; and
a processor,
wherein the processor and the display are configured to
permit selection of at least one target aircraft identified on the display;
and
indicate the selection on the display through a combination of symbols for each target aircraft selected, wherein the processor and the display are configured to present a list of target aircraft, wherein the selection of the at least one target aircraft is from the list of target aircraft.

8. The apparatus of claim 7, wherein the processor and display are further configured to temporarily remove from the display all the other targets than the selected aircraft.

9. The apparatus of claim 7, wherein the processor is configured to present the list as a list of aircraft of interest based on at least one criterion.

10. The apparatus of claim 9, wherein the criterion comprises at least one of relevance to a given operation or having triggered an alert.

11. The apparatus of claim 7, wherein the selection comprises selection of traffic to follow.

12. The apparatus of claim 7, wherein the selection is indicated for a predetermined time or until a predetermined further trigger occurs.

13. The apparatus of claim 7, wherein the selection comprises selection of traffic to follow.

14. An apparatus, comprising:
a display; and
a processor,
wherein the processor and the display are configured to
permit selection of at least one target aircraft identified on the display;
and
temporarily remove from the display all the other targets than the selected aircraft, wherein the processor and the display are further configured to alter an appearance of the selected aircraft.

15. The apparatus of claim 14, wherein the temporary removal is for a predetermined time.

16. The apparatus of claim 14, wherein the altered appearance comprises displaying a combination of symbols for each target aircraft selected.

17. A method, comprising:
permitting selection of at least one target aircraft identified on a display;
and
indicating the selection on the display through a combination of symbols for each target aircraft selected, wherein the processor and the display are configured to indicate the selection by displaying, for each selected aircraft, a set of relatively offset multiple nearly co-located icons, such that the set of multiple nearly co-located icons appear as a combined symbol.

18. The method of claim 17, further comprising:
temporarily removing from the display all the other targets than the selected aircraft.

19. The method of claim 17, wherein the selection is indicated for a predetermined time.

20. The method of claim 17, wherein the selection is indicated until a predetermined further trigger occurs.

21. The apparatus of claim 17, wherein the processor and the display are configured to indicate the selection by, for each selected aircraft, repeatedly changing a symbol associated with the selected aircraft.

\* \* \* \* \*